United States Patent
Jarvinen et al.

(10) Patent No.: US 6,227,791 B1
(45) Date of Patent: May 8, 2001

(54) ASSIST MECHANISM FOR LOADING AND UNLOADING CONTAINERS OF COMPRESSED GAS

(75) Inventors: Jari Jarvinen, Coral Springs, FL (US); Thomas Cassar, St. James, NY (US)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/174,238

(22) Filed: Oct. 16, 1998

Related U.S. Application Data

(60) Provisional application No. 60/063,740, filed on Oct. 17, 1997.

(51) Int. Cl.$^7$ ............................................ B60P 3/00
(52) U.S. Cl. .................... 414/541; 414/477; 414/549; 414/911; 280/79.6
(58) Field of Search .................... 414/449, 477, 414/478, 479, 491, 501, 522, 541, 542, 620, 911, 549; 280/79.6

(56) References Cited

U.S. PATENT DOCUMENTS

| | | | |
|---|---|---|---|
| 1,425,999 | * 8/1922 | Morrow | 414/449 X |
| 3,656,637 | * 4/1972 | Lynn et al. | 414/542 |
| 4,016,983 | * 4/1977 | Dadisman | 414/781 X |
| 4,023,690 | * 5/1977 | Goode | 414/477 X |
| 4,616,972 | * 10/1986 | McFarland | 414/522 X |
| 4,726,499 | 2/1988 | Hoerner . | |
| 4,865,339 | * 9/1989 | Rundborg et al. | 414/477 X |
| 5,192,179 | 3/1993 | Kovacs . | |
| 5,618,150 | * 4/1997 | Poindexter | 414/478 X |
| 5,651,657 | * 7/1997 | Poindexter | 414/541 |
| 5,806,868 | * 9/1998 | Collins | 280/79.6 |
| 5,816,764 | * 10/1998 | Bohata | 414/477 |
| 5,967,736 | * 10/1999 | Poindexter | 414/549 |
| 6,068,315 | * 7/2000 | Poindexter | 414/549 |

FOREIGN PATENT DOCUMENTS

4017118 * 12/1991 (DE) .................................. 280/79.6

* cited by examiner

Primary Examiner—James W. Keenan
(74) Attorney, Agent, or Firm—Dilworth & Barrese, LLP

(57) ABSTRACT

An assist mechanism for loading and unloading irregularly shaped cargo, such as for example, containers of compressed gas, includes a frame assembly and a handling assembly slidably engageable and movable with respect to the frame assembly. The handling assembly is movable along at least two axes to facilitate loading and unloading cargo, and includes a slide assembly having a powered pivotable support arm, a cuff assembly pivotably attached to the support arm, and optionally a handle assembly attached to the cuff assembly.

16 Claims, 4 Drawing Sheets

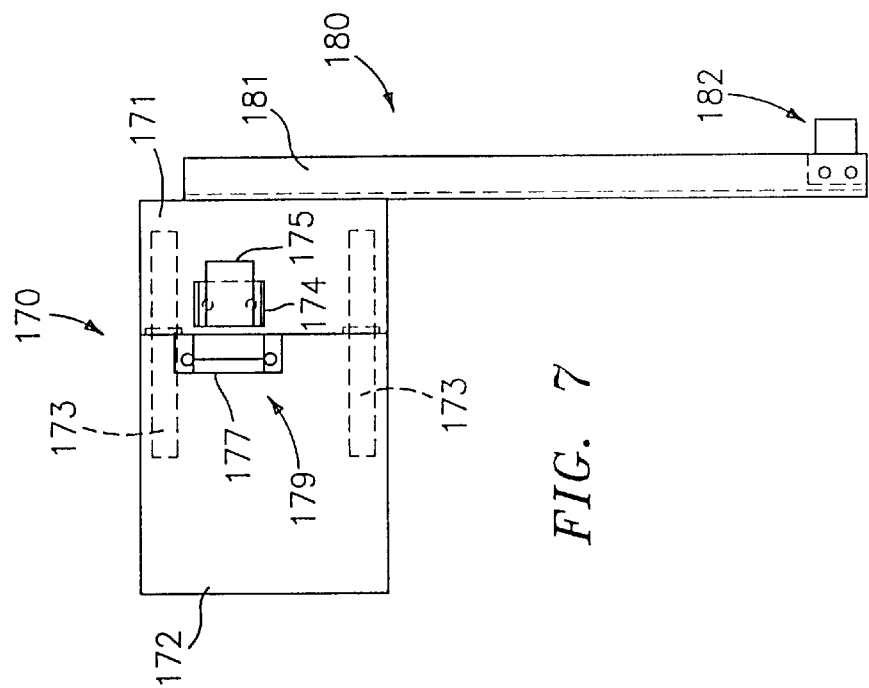
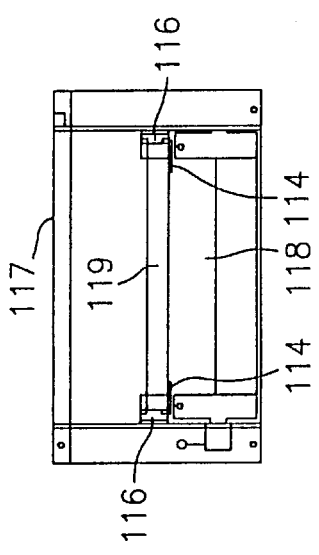
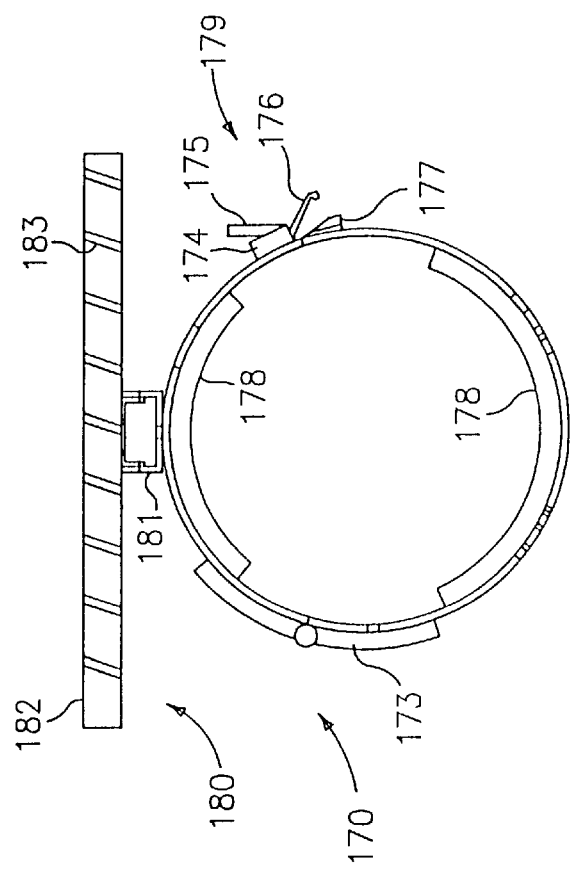
FIG. 7
FIG. 6
FIG. 8

ASSIST MECHANISM FOR LOADING AND UNLOADING CONTAINERS OF COMPRESSED GAS

This application claim benefit to provisional application 60/063,740 Oct. 17, 1997.

BACKGROUND

1. Field of the Invention

The present invention relates to an assist mechanism to facilitate the loading and unloading of cargo into vehicles such as vans, pickups and paneled trucks, and in particular for lifting irregularly shaped items such as cylindrical containers, particularly bottles of compressed gas.

2. Background of the Art

Gases such as nitrogen, oxygen, acetylene, carbon dioxide and the like, are typically transported in steel bottles in a compressed state. The bottles are generally cylindrical in shape and can weigh 130 pounds or more.

Generally, the gas bottles are moved from a storage facility to a vehicle such as a truck or van, which transports one or more of the gas bottles to the site where they are intended to be used. The gas bottles can be moved along level ground by means of wheeled dollies or hand trucks. However, loading a bottle into a truck or van presents a difficulty since the bottle generally has to be lifted and moved within a tight space.

Workers responsible for transporting the gas bottles often have to bend over to lift or move the gas bottle. This puts a great deal of stress on the musculoskeletal system of the body and can lead to injury, especially to the back, shoulders, and wrists of the worker.

Conventional hydraulic lifts used for loading cargo onto trucks and vans, such as typical lift gates, are often costly, bulky, and not well adapted for handling irregularly shaped items such as gas bottles and other cylinders. These lifts generally move only in a vertical manner and require the operator to lift or carry the cargo into the vehicle once the vertical lift has completed its path of travel. Accordingly, there is a need for an effective, inexpensive assist mechanism for loading/unloading cargo, such as gas bottles and drums, which can also be retrofitted to conventional trucks and vans.

SUMMARY

An assist mechanism for loading and unloading irregularly shaped cargo, such as for example, containers of compressed gas, includes a frame assembly and a handling assembly slidably engageable and movable with respect to the frame assembly. For purposes of this discussion, the assist mechanism will be described with respect to loading and unloading cylindrical canisters such as gas containers. However, it is recognized that the principles of the present lift assist mechanism may be applied for use with any type of cargo. In the preferred embodiment, the handling assembly is movable along at least two axes to facilitate loading and unloading cargo, and includes a slide assembly having a powered pivotable support arm, a cuff assembly pivotably attached to the support arm, and optionally a handle assembly attached to the cuff assembly.

To load the gas bottle into, for example, a van or truck, the cuff assembly is adjusted to engage the gas bottle at about the center of gravity of the gas bottle. A drive mechanism is provided to lift or drop the assembly, and may comprise a pneumatic lift, a hydraulic lift, or other type of mechanical drive mechanism such as a motorized device, screw drive mechanism, gear mechanism or the like. The device may also include levers and pulleys for manual operation. The device may also be a combination of both automatic and manual mechanisms.

By the application of lifting power, the support arm is pivoted upwardly in a generally vertical direction to lift the gas bottle until the gas bottle is high enough to be loaded into the truck by being pivoted in a horizontal direction. The slide assembly and gas bottle are then pushed forward along the frame assembly, after which the gas bottle can be secured by means of safety braces. The pivoting of the bottle to the horizontal position can be accomplished manually or automatically through the provision of linkage assembly and drive assembly. Likewise, the slide assembly may also be manual or automatic.

BRIEF DESCRIPTION OF THE DRAWINGS

Various embodiments of the invention are described herein with respect to the drawings wherein:

FIG. 6 is an end view of the frame assembly; and,

FIGS. 7 and 8 are, respectively, side elevational and plan views of the cuff assembly and handle assembly.

DETAILED DESCRIPTION OF PREFERRED EMBODIMENTS

Figure 1:
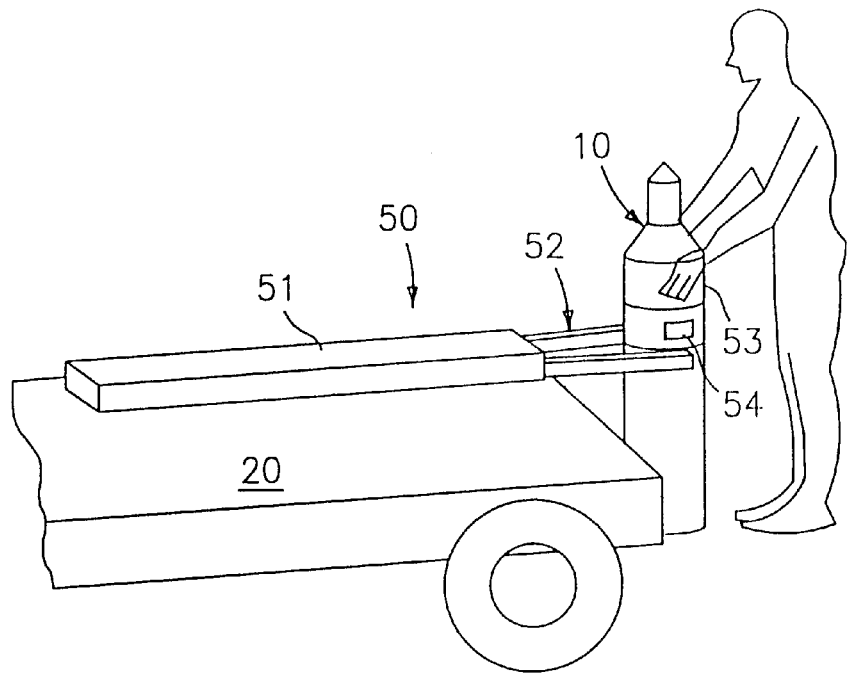
FIGS. 1 and 2 are perspective drawings illustrating the loading of a gas cylinder with a non-powered assist mechanism.
Figure 2:
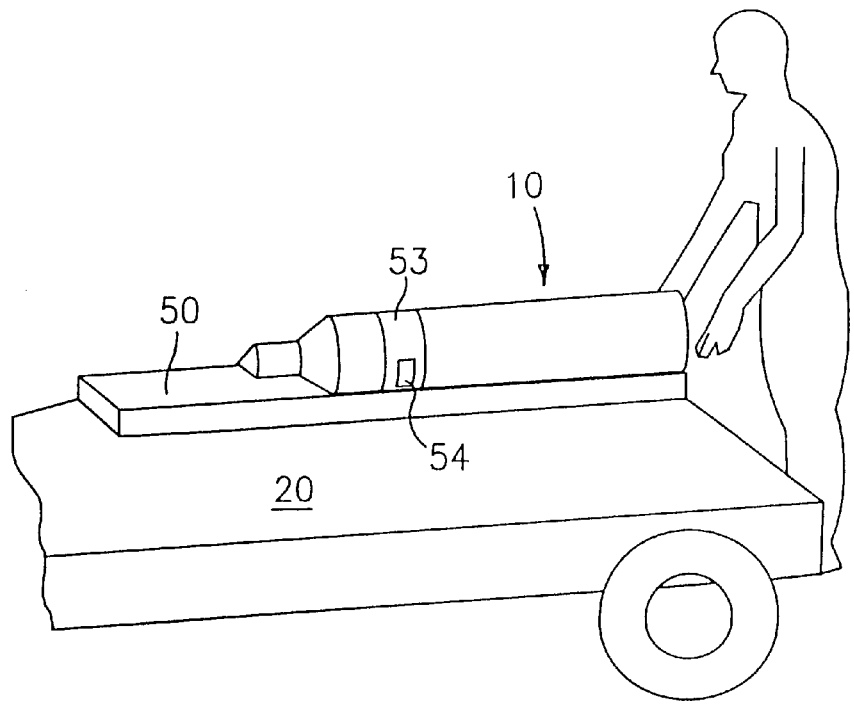

Referring now to the drawings, in which like reference numerals illustrate similar or identical elements, there is shown the lift assist mechanism disclosed herein. Referring in particular to FIGS. 1 and 2, the lift mechanism and operation and use thereof are illustrated. To load a gas bottle 10 into a vehicle 20 the gas bottle 10 is brought into an upright position at the rear of the vehicle 20. (FIG. 1) By pulling out the slide assembly 52 from frame 51, collar 53 of the lift mechanism 50, which is mounted at the rear of slide assembly 52, can be positioned around the gas bottle 10 and secured thereto. As shown in FIG. 2 the gas bottle 10 can be moved from an initial vertical orientation to a horizontal orientation for storage in the vehicle by pivoting gas bottle 10 around pivot point 54. Optimally, the collar 53 is secured to the gas bottle 10 at or below the center of gravity of the gas bottle 10 to reduce the force necessary to accomplish the pivoting movement, and collar 53 maintains the positioning of bottle 10 by preventing side to side rolling during loading. When the gas bottle has been horizontally positioned the slide assembly can be moved more fully into frame 51 to load the gas bottle 10 into the vehicle 20. For loading multiple bottles, bottle 10 would be disengaged from collar 53 and moved to a secure position within the vehicle 20, to allow for loading of another bottle. The process is reversed in order to effect unloading.

Referring now to FIGS. 3 to 8, an alternative embodiment of the mechanical lift assist mechanism is shown which employs an automatic or powered mechanism to lift the gas bottle, such as pneumatics, hydraulics, motor drive, screw drive, gear assembly, and the like. As used herein the terms "left" and "right", and "front" and "rear" are used relative to each other and with respect to the drawings.

Lift mechanism 100 includes frame assembly 101, and a cargo handling assembly 102 which is removably and slidably engaged with frame assembly 101. The lift mechanism is sized and configured to engage and hold a conventional bottle for containing compressed gas, but may be configured to hold any other irregularly shaped item, as desired.

Figure 3:
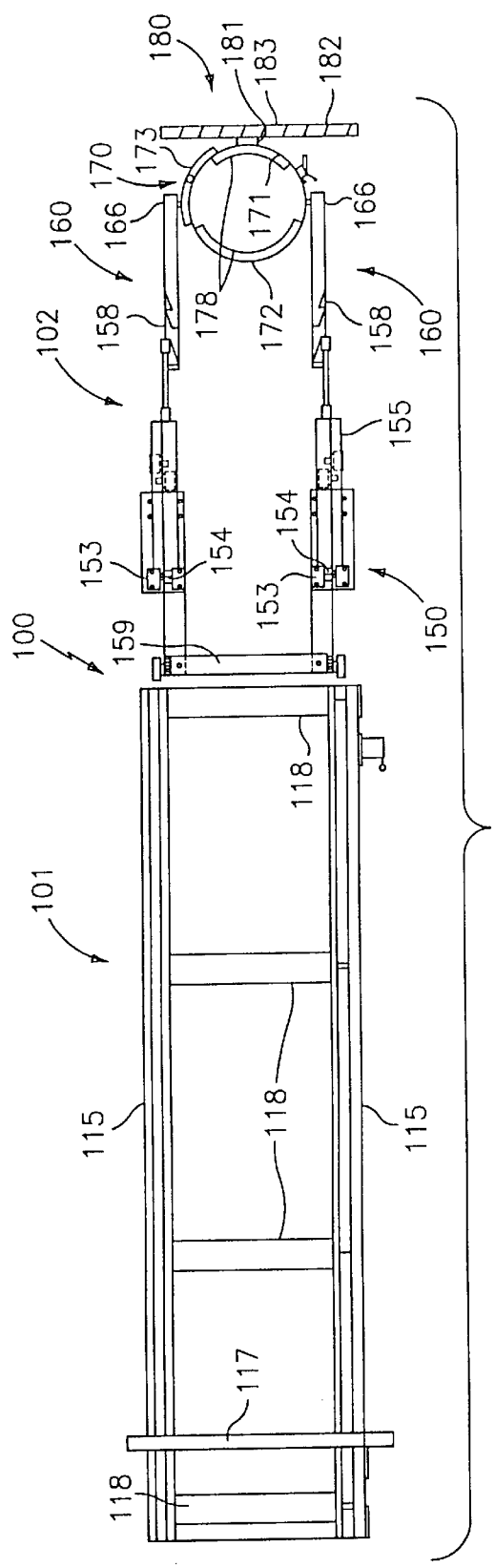
FIGS. 3 and 4 are, respectively, plan and side elevational views of a powered embodiment of the assist mechanism.
Figure 4:
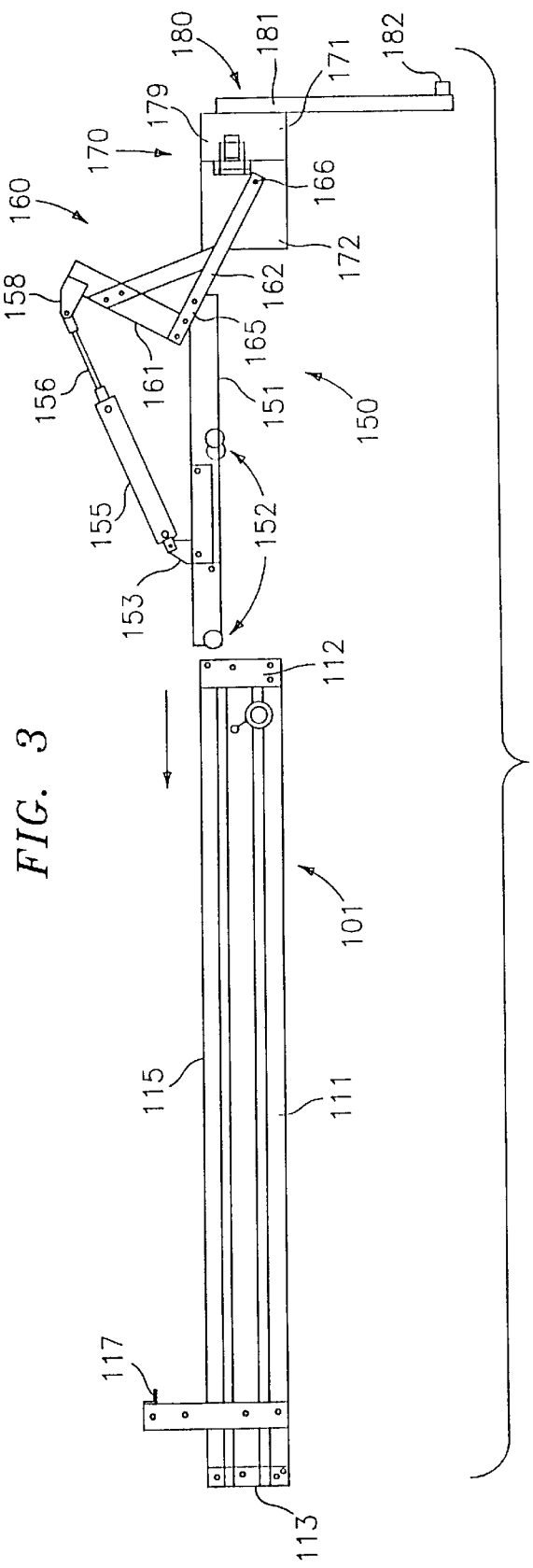

Referring to FIGS. 3, 4 and 6, the frame assembly 101 includes parallel left and right longitudinally extending main base runners 111 laterally connected by front and rear vertical frame supports 113 and 112, respectively, ont safety brace 117 and removable rear safety brace 119 provide additional supports to prevent the gas bottle from sliding off the assist mechanism after being loaded thereon. Frame assembly 101 further includes longitudinal left and right rails 115 supported by corresponding longitudinal roller supports 114. Left and right roller slide tracks 116 in the corresponding left and right rails are adapted to receive the roller wheels of the handling assembly 102 to permit longitudinal forward or rearward movement of the handling assembly relative to the frame assembly.

The frame assembly 101 is fabricated from a suitable material, preferably a metal such as steel, stainless steel, heavy gauge aluminum, etc., and incorporates structure which permits the frame assembly to be fixedly attached to the floor or roof of a van, truck, or other such vehicle, by any appropriate means such as, for example, bolts, screws, rivets, welding, etc.

Referring to FIGS. 3, 4, 5, 7 and 8, the handling assembly 102 includes a slide assembly 150, a cuff assembly 170 pivotally attached to the slide assembly, and, optionally, a handle assembly 180 fixedly attached to a collar portion of the cuff assembly 170.

The slide assembly 150 includes left and right longitudinally extending base runners 151, each base runner including at least two, and preferably three, roller wheels 152. The roller wheels 152 are adapted to run in the roller slide track 116 (FIG. 6) to permit the sliding longitudinal movement of the handling assembly 102 with respect to the frame assembly 101. The base runners 151 are connected to each other at their front ends by a laterally extending brace 159. The slide assembly 150 may include one or more stages to provide, for example, a telescoping assembly. The telescopic feature may extend and/or retract manually or automatically under power, such as, for example, pneumatic, hydraulic or electric motor driven. Thus, with a powered slide mechanism, when the load has been lifted to its proper orientation, a loader motor can be automatically engaged to pull the load inside the vehicle.

Figure 5:
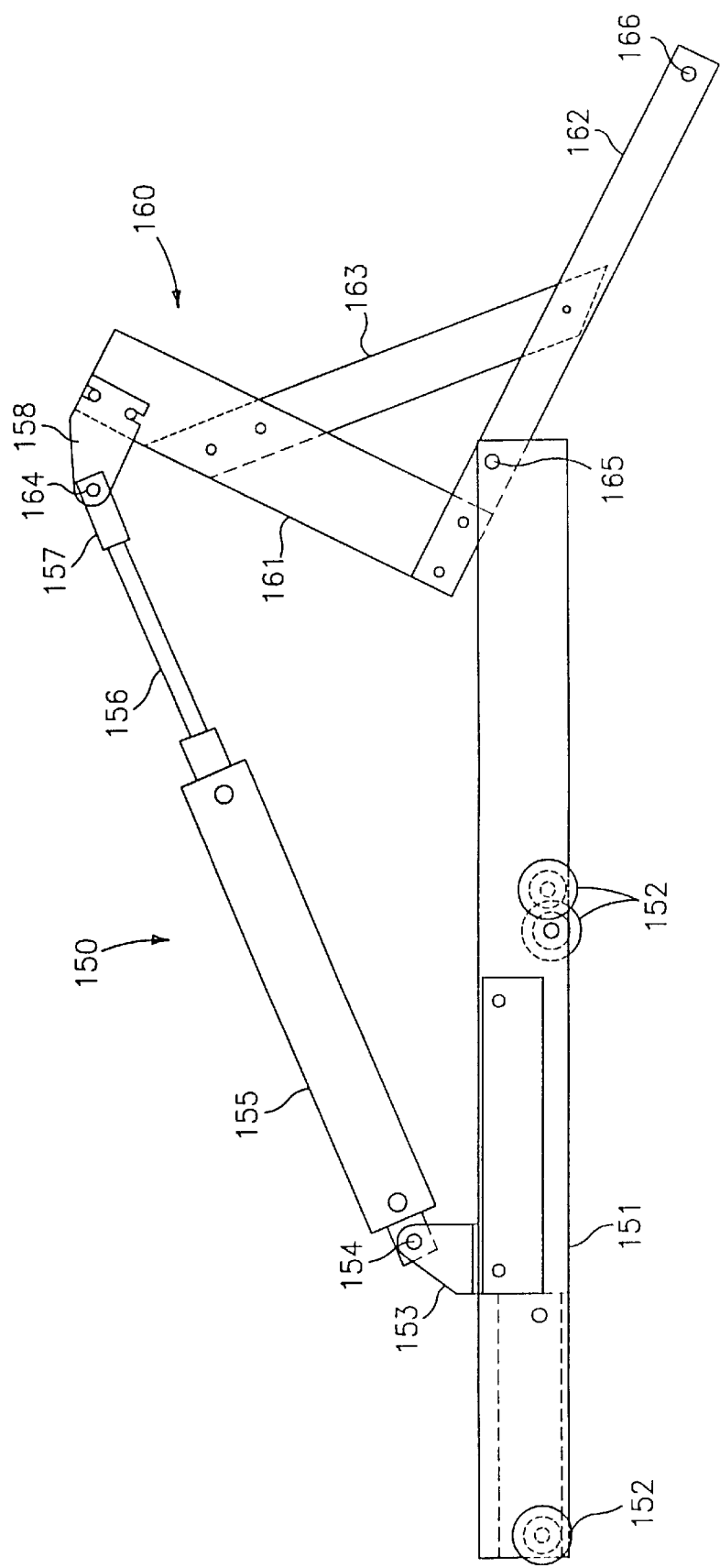
FIG. 5 is a side elevational view of the slide assembly.

As shown in FIG. 5, left and right lower mounting fixtures 153 project upward from left and right base runners 151, to which the mounting fixtures are individually and respectively attached. A pneumatic cylinder 155 is pivotally attached to each lower mounting fixture 153 by a respective pivot pin 154. The pneumatic cylinders 155 are preferably double acting with a 1.5 inch bore and an 8 inch stroke. Alternatively, a mechanical drive mechanism may replace the pneumatic cylinders to provide a motor-driven lift mechanism. The mechanical drive may include a worm gear arrangement, rack and pinion arrangement, or the like.

A pneumatic storage tank (not shown) charged to about 100 psi by a compressor (not shown) can be used to provide power for the pneumatic cylinders 155. The pneumatic storage tank can also include a standard fitting for permitting recharging of the system at a conventional gasoline station air pump. The motor-driven embodiment may draw power from a battery, such as the vehicle's battery, or may be powered from its own generator.

As best seen in FIG. 5, each pneumatic cylinder 155 includes a reciprocatingly slidable cylinder rod 156 which moves axially within a bore of the pneumatic cylinder 155 in response to the application thereto of pneumatic power. The free end 157 of each cylinder rod 156 is pivotally attached to a respective one of left and right upper mounting fixtures 158 at pivot pins 164. It should be understood that while pneumatic power is a preferred means of powering the L-shaped support arms 160 for lifting the gas bottle as described below, other sources of power such as a motor drive, and electric or hydraulic power can alternatively be employed and are contemplated as being within the scope of this invention. Furthermore, a cable winch to directly lift the load may be employed.

Each upper mounting fixture 158 is fixedly attached to a respective upright beam 161 of each left and right L-shaped support arm 160. A respective horizontal beam 162 is connected to the bottom of a corresponding upright beam 161 and forms a right angle therewith. A support brace 163 extends diagonally between the upright and horizontal beams 161, 162 of each of the support arms 160.

A pin 165 pivotally connects each horizontal beam 162 to a respective base runner 151 such that operation of the pneumatic cylinder 155 effects the pivoting of the L-shaped arm 160 around pin 165.

Referring now to FIGS. 3, 4, 7, and 8, cuff assembly 170 includes rear collar portion 171 pivotally connected to front collar portion 172 by at least one, and preferably two or more strap hinges 173. When closed, rear and front collar portions 171, 172 define a cylindrical collar ring adapted to fit around and securely engage a gas bottle. Pads 178 constructed of a rubber such as neoprene on the inner surface of each of the collar portions provide for frictional gripping of the gas bottle as well as cushioning. The front collar portion 172 is rotatably connected to the end portions of horizontal beams 162 at pivot pin 166. Preferably, the collar portions 171 and 172 are adjustable with respect to each other to vary the diameter of the ring.

The cuff assembly 170 includes a latch assembly 179 having a mounting support 174 attached to front collar portion 172, a handle 175 pivotally mounted to mounting support 174, a catch 176 extending from handle 175, and a projection 177 attached to rear collar portion 171 which is engaged by catch 176 when the latch is closed. The latch assembly 179 provides means to maintain the rear and front collar portions 171 and 172 in the closed configuration to secure the gas bottle, and any suitable latch assembly may be used.

It is contemplated that cuff assembly 170 may be replaced by alternative lifting/support means such as, for example, a platform, a clamp device, or a hook. Thus, the lift assist mechanism is not constrained to lifting only compressed gas cylinders. The lifting/support means may be linked to the lift device in a manner which permits it to rotate as it is lifted, to keep the platform parallel to the ground; or it can remain rotationally unconstrained to allow the load to rotate into the proper loading position. Thus, the platform configuration in a linked rotation can be used to handle any load that can fit into the vehicle without the need to re-orient or rotate it. The clamp device having a free rotation configuration will be mainly used for tall objects that need to be re-oriented to fit into or on the vehicle.

Handle assembly 180 includes a handle extension 181 attached to the rear collar portion 171 and extending vertically downward therefrom, and a cross bar 182 attached to the bottom end of the handle extension 181. Preferably, the cross bar 182 is wrapped with a friction grip 183 to provide a good gripping surface.

Referring to FIG. 4, the horizontal extension 162 of the L-shaped arm 160 can be angled downward from the longitudinal direction defined by the base runner 151. The present invention enables the cuff assembly 170 to grip the gas bottle such that pivot pins 166 are at or below the level of the center of gravity of the gas bottle, which can be lower than the horizontal level of the base runners 151. By pivoting the L-shaped support arms with pneumatic power the level of the cuff assembly can be adjusted to different heights to accommodate different sized gas bottles or differences in ground level between the van or truck and the gas bottle. The gas bottle is then engaged and secured in cuff assembly 170 by placing the gas bottle in juxtaposition with the inside of front collar portion 172, and closing and latching the rear collar portion 171. The gas bottle can then be lifted by operating the pneumatic cylinder and pivoting L-shaped arms 160 to bring the center of gravity of the gas bottle up to about the level of the lift mechanism 100. The gas bottle can then be manually pivoted by means of the handle assembly with only about six pounds of force. Once the gas bottle is horizontally positioned the handling assembly 102 is pushed forward along the frame assembly 101 until the top of the gas bottle is near the front safety brace 117. The rear safety brace is then positioned across frame assembly 101 thereby blocking the bottom of the gas bottle and preventing the gas bottle from sliding off the rear of the assist mechanism 100. To unload the gas bottle the above procedure is reversed.

In addition to the powered lift the adjustability of the cuff assembly height relative to the gas bottle is a significant ergonomically beneficial feature provided by this invention. Placement of the cuff assembly above the gas bottle's center of gravity by, for example, only four inches increases the force required to pivot the gas bottle to about 27 pounds and additionally requires a vertical force of about 15 pounds to maintain the gas bottle in the horizontal position. The present invention significantly reduces the stress on the musculoskeletal system of the worker's body and thereby reduces the risk of injury.

Although the illustrative embodiments of the present disclosure have been described herein with reference to the accompanying drawings, it is to be understood that the invention is not limited to those precise embodiments, and that various other changes and modifications may be effected therein by one having ordinary skill in the art without departing from the scope or spirit of the disclosure. For example, the disclosed lift mechanism may be used with, but is not limited to the following vehicles: vans, mini-vans, utility vans, pick-up trucks, sport utility vehicles, station wagons, flatbed trucks, paneled trucks, etc. The device may be equipped with a quick attachment device or it may be permanently installed. The device may also be attached to the roof of the vehicle. All such changes and modifications are intended to be within the scope of the disclosure.

What is claimed is:

1. A device for loading and unloading gas bottles onto and off of a vehicle, comprising:

a frame assembly adapted to be mounted to a vehicle;

a grip assembly for engaging and gripping the outer circumference of a gas bottle;

a slide assembly operatively positioned between the frame assembly and the grip assembly, the slide assembly having a proximal and a distal end and being movable with respect to the frame assembly to facilitate loading/unloading of the gas bottle, wherein the grip assembly is rotatable about a horizontal axis adjacent the distal end of the slide assembly; and a support arm positioned between the slide assembly and the grip assembly, one end of the support arm being pivotably connected to the slide assembly and the other end of the support arm being pivotably secured to the grip assembly, the support arm being movable to adjust the height of the grip assembly in relation to the slide assembly.

2. A device according to claim 1, wherein the slide assembly is movable along a substantially horizontal axis to facilitate loading/unloading of the gas bottle.

3. A device according to claim 1, wherein the grip assembly is movable along at least two axes with respect to the frame assembly.

4. A device according to claim 1, wherein the slide assembly is slidable with respect to the frame assembly in a horizontal direction.

5. A device according to claim 4, wherein the slide assembly is manually slidable.

6. A device according to claim 1, wherein the support arm is manually pivotable.

7. A device according to claim 1, wherein the slide assembly is manually movable.

8. A device according to claim 1, further comprising a drive mechanism to move the support arm.

9. A device according to claim 8, wherein the drive mechanism is pneumatically powered.

10. A device according to claim 8, wherein the drive mechanism is hydraulically powered.

11. A device according to claim 8, wherein the drive mechanism is motor driven.

12. A device for loading/unloading cylindrical gas bottles with respect to a vehicle, comprising:

a frame assembly adapted to be mounted to a vehicle;

an adjustable collar assembly for gripping the outer circumference of gas bottles; and a slide assembly connected between the frame assembly and the collar assembly, the slide assembly being movable between retracted and extended positions with respect to the frame assembly to facilitate loading/unloading of gas bottles, wherein the adjustable collar assembly is rotatable about a horizontal axis adjacent a distal end of the slide assembly and the slide assembly includes a pivotable bracket which is movable to adjust the height of the adjustable collar assembly and a roller assembly which is movable in a horizontal direction with respect to the frame assembly.

13. A device according to claim 12, further comprising a drive mechanism operatively connected to the pivotable bracket, the drive mechanism being operable to adjust the height of the adjustable collar assembly.

14. A method for loading/unloading a cylindrical container to or from a vehicle, comprising the steps of:

securing a lift assembly to the vehicle, the lift assembly including a frame, a slide assembly and a grip assembly, the slide assembly being movable between retracted and extended positions in relation to the frame and the grip assembly being rotatable about a horizontal axis adjacent the distal end of the slide assembly;

adjusting the height of the grip assembly to position the grip assembly at or below the level of the center of gravity of the cylindrical container;

securing a cylindrical container to the grip assembly;

lifting the cylindrical container along a first axis, and;

sliding the cylindrical container along a second axis to load/unload the container to or from the vehicle.

15. A method according to claim 14, further comprising the step of pivoting the cylindrical container approximately 90° after the lifting step to facilitate the sliding step.

16. A method according to claim 14, wherein at least the lifting step is performed under automatic power.

* * * * *

UNITED STATES PATENT AND TRADEMARK OFFICE
CERTIFICATE OF CORRECTION

PATENT NO.   : 6,227,791 B1
DATED        : May 8, 2001
INVENTOR(S)  : Jari Jarvinen et al.

It is certified that error appears in the above-identified patent and that said Letters Patent is hereby corrected as shown below:

<u>Title page,</u>
Item [73], should read -- MarketSpan Corporation --.

Signed and Sealed this

Twenty-sixth Day of November, 2002

*Attest:*

JAMES E. ROGAN
*Director of the United States Patent and Trademark Office*

*Attesting Officer*